Oct. 3, 1961     C. L. TICHENOR     3,003,045
ELECTRICAL SWITCHING DEVICE

Filed Sept. 8, 1958

INVENTOR.

C. L. Tichenor

United States Patent Office 3,003,045
Patented Oct. 3, 1961

3,003,045
ELECTRICAL SWITCHING DEVICE
Clyde L. Tichenor, Encino, Calif.
Filed Sept. 8, 1958, Ser. No. 759,580
2 Claims. (Cl. 200—61.08)

This invention relates to a device that opens an electrical circuit connection, for instance, one of the power carrying wires of an electric motor.

An object of the present invention is to provide a simple and novel device to control electrical circuits according to whether or not mechanical force has been properly applied to the device.

Another object of the invention is to provide a device of the character above referred to that is adapted to be set or retained in one operative position, and is forced to another operative position cutting open an electrical circuit wire that is connected through the device.

It is a further object of the invention that in cutting open the electric circuit wire the device retains the cut wire end that is connected to the power source capturing and preventing it from shorting out to any other conductor.

The present device has many different uses to control means by way of an electrical circuit wire or conductor. As an example, said device may be used as an emergency limit switch on electrically powered or controlled actuators such as perform many control functions on modern jet aircraft or the like so that any other electric circuit failures that allow mechanical movement beyond normal limits will be disconnected and deactivate the driving power before severe physical damage results.

The invention also has for its objects to provide such means that will meet the most rigorous military specifications and be positive in operation, convenient in use, easily installed in a working position and easily disconnected therefrom, economical to manufacture, relatively simple, high in reliability both in sure actuation and operation after extreme periods of elapsed time, and of general superiority and serviceability.

The invention also comprises novel details of construction and novel combinations and arrangements of parts, which will more fully appear in the course of the following description. However, the drawing merely shows and the following description merely describes, one embodiment of the present invention, which is given by way of example or illustration only.

In the drawing, like reference characters designate like parts in the various views.

Figure 1:
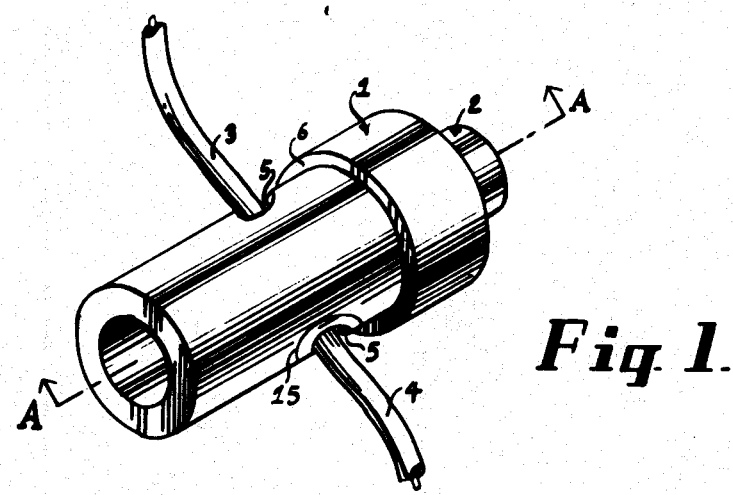
FIG. 1 is a perspective view, with the mounting plate removed, of a switching device and circuit wire according to the present invention, the view showing the parts in the position assumed thereof before application of an actuating force.

The present device is shown as comprising, generally, a base tube 1, a slide rod 2 mounted to move relative to and within said base tube, two holes 5 through the side wall of the base tube 1 that provide means for passing a wire or conductor of the electrical circuit to be controlled in 4 and out 3 of the base tube.

It is to be noted that the base tube 1 has two diameters of major and minor dimension, and that said diameters form a shoulder 6 which is the means against which the mounting plate 7 and mounting opening 13 both hold the base tube 1 and allow a suitable reactive force to resist the actuating force applied to the slide rod 2 by the initiating member 8. It is to be further noted that the circuit wire or conductor 3 and 4 passing through the holes 5 in the side wall of said base tube prevent the device from being withdrawn back out of the opening 13 in the mounting plate 7.

It may be seen that the slide rod 2 has a surface 10 cut at an angle on one side of said slide rod and said cut is aligned directly opposite one hole 5 that passes through the wall of the base tube 1. Through this particular hole 5 passes the end of the circuit wire or conductor that connects to the electric power source of the circuit and suitable identification means 15, in FIG. 1, is provided to indicate this. The function of the angle cut 10 on the slide rod 2 is two fold: To clamp the cut end of the electric power source wire or conductor 4 and thus prevent said conductor from shorting out to any conductive surfaces, and to wedge the slide rod tightly between the cut conductor 4 and the inside of the base tube 1 thus locking the slide rod and conductor into said base tube until they are intentionally separated during repair.

The other part of the slide rod end 9, adjacent to the angle cut 10 is a relatively broad flat surface the function of which is to act as a shear blade or cutters in conjunction with the edge 14 of hole 5 in the base tube 1 through which passes the conductor 3, which might be especially adapted to cutting if so desired, leading to the electrical actuator or control device. In suitable electric circuits the sheared and loose end of conductor 3 would connect to chassis ground through the actuator or control device, or the circuitry could be electrically isolated from the chassis, in either event the possible shorting of the loose conductor end 3 would have no electrical significance.

The shearing surfaces 9 and 14 of the slide rod 2 and base tube hole 5 respectively require that said slide rod and said base tube be composed of electrically insulating material of suitable hardness and strength to shear through the conductor and its insulation when both are composed of a single homogeneous material as shown and although the device is shown in this form it is contemplated that small hard shearing surfaces could be suitably attached to the slide rod 2 at point 9 and the base tube hole at point 14. These small shearing surfaces might even be metallic if required and therefore various materials or combinations of them might be used without departing from the present invention.

Figure 2:
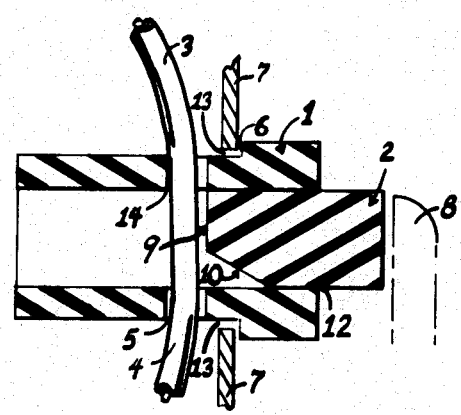
FIG. 2 is a longitudinal sectional view as taken on the line A—A of FIG. 1 of the device showing the mounting plate and circuit wire, this view also shows the parts in the position assumed thereof before application of an actuating force.
Figure 3:
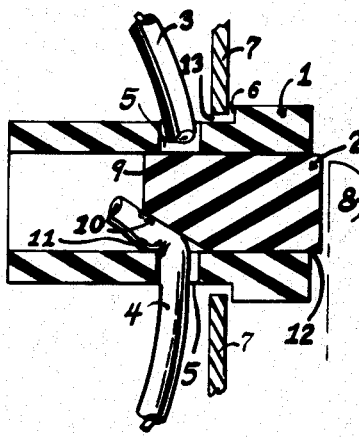
FIG. 3 is a similar longitudinal sectional view of the device showing the mounting plate and circuit wires, this view shows the parts in the position assumed thereby, after the application of an actuating force.

During manufacturing assembly the shearing surface 9 of the slide rod 2 is correctly aligned opposite the base tube hole edge 14 as said slide rod is positioned into said base tube as shown in FIG. 1 and FIG. 2. The slide rod 2 is held in the preactuated position in relation to the base tube 2 as shown in FIG. 1 and FIG. 2 by means of a press, tight or mechanical fit and when desired said slide rod may also be held in position, with or without other means, by a suitable binder or adhesive 12 applied between said base tube and said slide rod.

In a normal installation the device is installed as shown in FIG. 2 by inserting it into the hole 13 in the mounting plate 7. The circuit conductor 3 or 4 is inserted through the hole 5 in the base tube 1 in the correct direction so that the electric power source conductor end passes through identification mark 15 to the opposite base tube hole 5 and then to the actuator or control device. The mounting plate 7 is thus captured between the base tube shoulder 6 and the circuit conductor 3 and 4 and so therefore the device is installed.

During and after actuation the following events occur:
The initiating member 8 forces against the slide rod 2, the force is transmitted through the binding means 12 to the base tube shoulder 6 which is forced against the mounting plate 7; the reaction and initiating force increase until the binding means 12 is exceeded allowing the slide rod 2 to move into the base tube 1; the slide rod end 9 shears the circuit conductor 3 and 4 against the base tube hole edge 14; the slide rod end 9 and 10 also bends the conductor 4 at a right angle at the base tube hole edge 11; as the slide rod 2 continues moving into the base tube 1 said slide rod is wedged between the conductor 4 and the inside wall of the base tube 1 which also clamps said conductor end within the length of the base tube thus protecting said conductor and maintaining the mounting plate still captured between the clamped conductor 4 and the base tube shoulder 6.

While the foregoing specification illustrates and describes what I presently contemplate to be the best mode of producing my invention, the construction is naturally subject to modification without departing from the spirit and scope of my invention. Therefore, I do not desire to restrict the invention to the particular form of construction illustrated and described, but it is my desire to cover all modifications that may fall within the scope of the appended claims.

What is claimed and desired to be covered by Letters Patent is:

1. An electrical switching device comprising a tubular base with a major and minor outside diameter, said tubular base having a through hole transverse to the longitudinal axis of the tubular base in the portion of the tubular base having the minor outside diameter, said hole in the tubular base allowing passage of an external electrical circuit conductor through the tubular base, a cylindrical slide member within said tubular base having a combination hard flat surface transverse to its longitudinal axis and adjoining the tubular base suitable to force separation of the electrical circuit conductor, and an angular beveled surface adjacent to said flat surface and suitable to wedge immobile the severed circuit conductor end between said beveled surface and the inner wall of the tubular base.

2. An electrical switching device according to claim 1 in which the mounting of said device is accomplished by the combination of the major and minor outside diameters of the tubular base and the passage of the electrical circuit conductor through the tubular base, so that when the minor diameter is inserted through a hole in a mounting plate, the position of the device is fixed by the supporting major diameter on one side and the captured circuit wire on the other side of the plate.

References Cited in the file of this patent

UNITED STATES PATENTS

| | | |
|---|---|---|
| 2,105,286 | Jennings | Jan. 11, 1938 |
| 2,458,464 | Busacker et al. | Jan. 4, 1949 |
| 2,802,083 | Lapeyre | Aug. 6, 1957 |